United States Patent
Villanueva Vargas et al.

(10) Patent No.: US 10,407,252 B1
(45) Date of Patent: Sep. 10, 2019

(54) CONVEYOR ASSEMBLY

(71) Applicant: Nissan North America, Inc., Franklin, TN (US)

(72) Inventors: Victor Ramses Villanueva Vargas, Morelos (MX); Marco Antonio Cienfuegos Guzman, Morelos (MX); Victor Miguel Zuñiga Mendoza, Morelos (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/962,905

(22) Filed: Apr. 25, 2018

(51) Int. Cl.
*B65G 47/64* (2006.01)
*B65G 41/02* (2006.01)
*B65G 13/10* (2006.01)

(52) U.S. Cl.
CPC .......... *B65G 47/642* (2013.01); *B65G 41/02* (2013.01); *B65G 13/10* (2013.01)

(58) Field of Classification Search
CPC .... B65G 47/642; B65G 41/02; B65G 41/003; B65G 13/10; B65G 13/12
See application file for complete search history.

(56) References Cited

U.S. PATENT DOCUMENTS

| 2004/0007439 | A1 | 1/2004 | Wolkerstorfer | |
|---|---|---|---|---|
| 2005/0269184 | A1* | 12/2005 | Enya | B65G 37/02 198/369.2 |
| 2013/0341158 | A1* | 12/2013 | Yang | B65G 47/244 198/409 |
| 2018/0282074 | A1* | 10/2018 | Nothum, Jr. | A23P 20/12 |
| 2018/0327009 | A1* | 11/2018 | Takagawa | G05D 1/0214 |

FOREIGN PATENT DOCUMENTS

| FR | 1593129 | A | * | 5/1970 | ........... B65G 47/642 |
|---|---|---|---|---|---|
| FR | 2856998 | A1 | | 1/2005 | |
| JP | 57057119 | A | * | 4/1982 | ........... B65G 47/642 |

* cited by examiner

*Primary Examiner* — Mark A Deuble
(74) *Attorney, Agent, or Firm* — Global IP Counselors, LLP (57) ABSTRACT

A conveyor assembly includes a trolley, a skid, a stationary cam member and a cam follower. The skid is positioned on the trolley. The stationary cam member is downstream of the trolley. The cam follower is fixed to the trolley for pivotal movement with respect thereto. The cam follower moves in response to contact with the stationary cam. With the trolley in a first location the cam follower moves to a release orientation. With the trolley moved to a second location the cam follower moves to a stop orientation. In the stop orientation a surface of the cam follower contacts the skit restricting movement thereof. In the release orientation the cam follower is moved away from the skid such that the skid is movable in the second direction past the cam follower.

20 Claims, 6 Drawing Sheets

CONVEYOR ASSEMBLY

BACKGROUND

Field of the Invention

The present invention generally relates to conveyor assembly. More specifically, the present invention relates to a conveyor assembly that includes a cam apparatus that restricts movement of an article of manufacture on the conveyor assembly with the cam apparatus in a first orientation and releases the article of manufacture on the conveyor assembly with the cam apparatus moved to a second orientation.

Background Information

Assembly lines in manufacturing facilities are often provided with an assembly station that is set up to produce both a manufactured component and a variant of the manufactured component. When completed, the manufactured component is moved to a downstream location along a first workflow path for further work or assembly with other components. The variant of the manufactured component may need to be moved to a second workflow path separate from the first workflow path.

SUMMARY

One object of the present disclosure is to provide a conveyor assembly with a mechanism that allows movement of an article of manufacture on a trolley with the trolley in a first location, and, restricts movement of the article of manufacture on the trolley while the trolley and the article of manufacture are moved to a second location.

In view of the state of the known technology, one aspect of the present disclosure is to provide a conveyor assembly with a trolley, a skid, a stationary cam member and a cam follower. The trolley is movable in a first direction between a first location and a second location spaced apart from the first location. The skid is configured such that with the skid positioned on the trolley, the skid is moveable in a second direction perpendicular to the first direction. The stationary cam member is positioned downstream from the first location. The cam follower is fixed to the trolley for pivotal movement with respect thereto. The cam follower is configured to move in response to contact with the stationary cam such that with the trolley in the first location the cam follower moves to a release orientation and with the trolley moved to the second location the cam follower moves to a stop orientation. In the stop orientation a surface of the cam follower contacts the skit restricting movement of the skid and in the release orientation the cam follower is moved away from the skid such that the skid is movable in the second direction past the cam follower.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
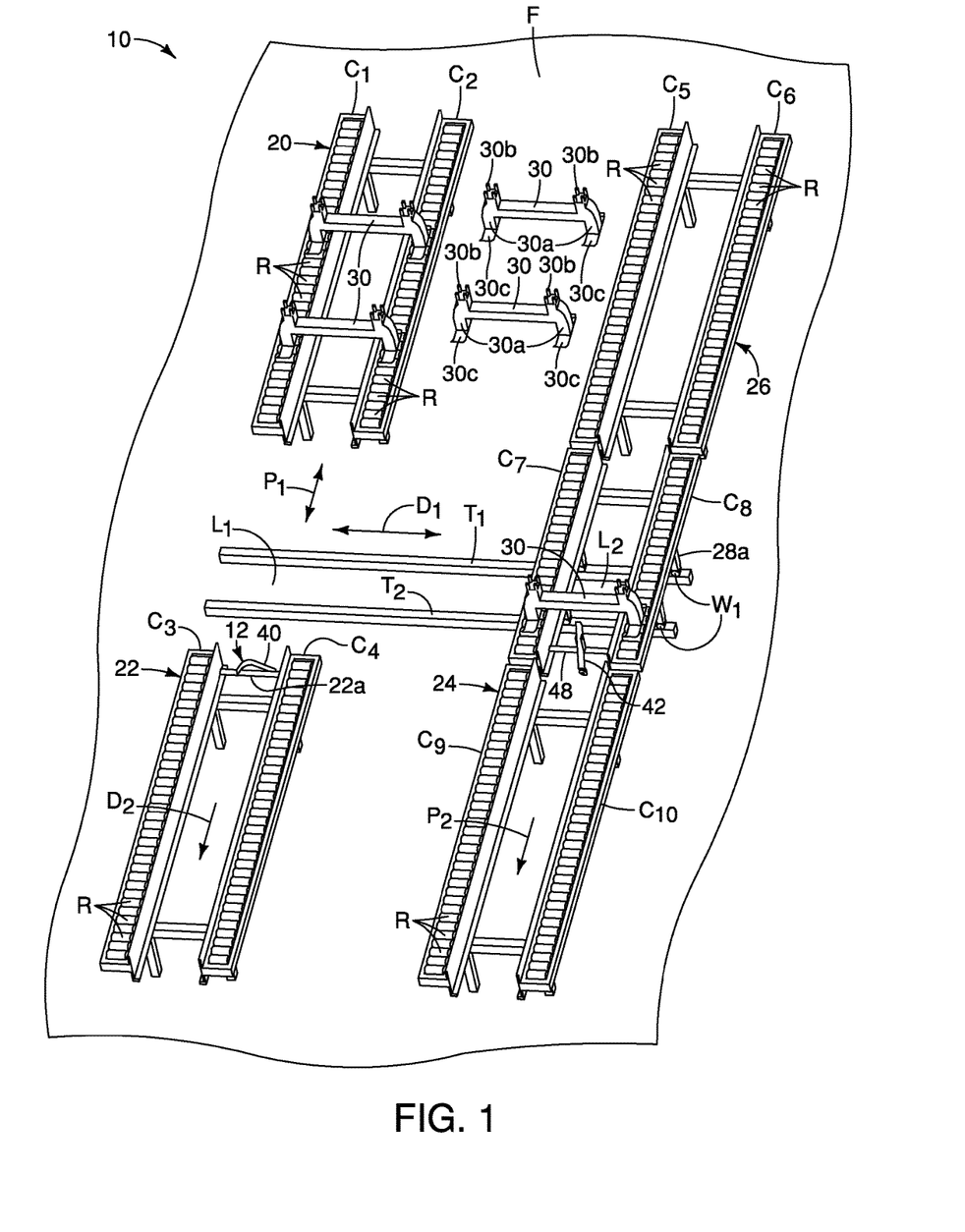
FIG. 1 is a schematic perspective view of a conveyor assembly that includes an assembly station, a first roller conveyor assembly, a second roller conveyor assembly, an optional second assembly station, a trolley and a cam apparatus, with the trolley positioned upstream of the second roller conveyor assembly in accordance with a depicted embodiment.

Referring initially to FIG. 1, a conveyor assembly 10 is illustrated in accordance with a first embodiment. The conveyor assembly 10 includes a cam apparatus 12 that assists in the movement of articles conveyed by the conveyor assembly 10, as described in greater detail below.

Figure 2:
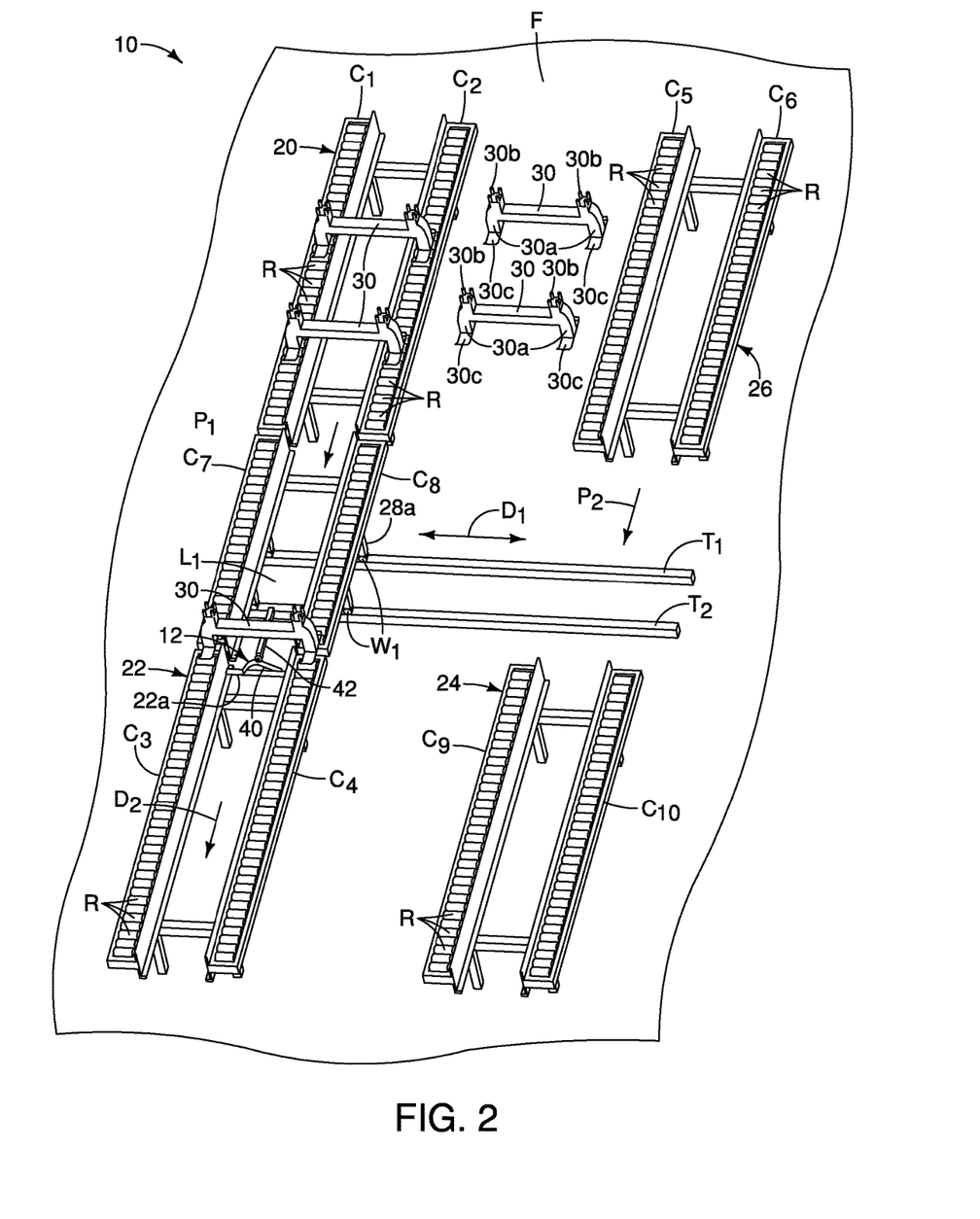
FIG. 2 is another schematic perspective view of the conveyor assembly similar to FIG. 1 with the trolley moved to a location between the assembly station and the first roller conveyor assembly in accordance with the depicted embodiment.

As shown in FIGS. 1 and 2, the conveyor assembly 10 is located on a floor F of a factory or other manufacturing facility. The conveyor assembly 10 includes a feeder roller conveyor assembly 20 (referred to hereinafter as an assembly station 20), a first roller conveyor assembly 22, a second roller conveyor assembly 24, an optional assembly station 26 and a trolley 28.

Each of the assembly station 20, the first roller conveyor assembly 22, the second roller conveyor assembly 24, the optional assembly station 26 and the trolley 28 includes two parallel conveyors, including conveyors $C_1$ and $C_2$, $C_3$ and $C_4$, $C_5$ and $C_6$, $C_7$ and $C_8$, and $C_9$ and $C_{10}$. Each of the conveyors $C_1$ thru $C_{10}$ includes a plurality of rollers R that are linearly aligned (parallel) with one another, supported by lubricated bearings (not shown) such that the rollers R freely rotate. Consequently, items put on top of the rollers R, such as skids 30 can be freely moved along the conveyors $C_1$ thru $C_{10}$ in a conventional manner. Since conveyors, such as the conveyors $T_1$ and $T_2$ and rollers such as the rollers R are conventional mechanical elements, further description of conveyors $T_1$ and $T_2$ and the rollers R is omitted for the sake of brevity.

As shown in FIGS. 1 and 2, the trolley 28 is movable in a first direction $D_1$ between a first location $L_1$ (FIG. 2) and a second location $L_2$ (FIG. 1) spaced span from the first location $L_1$. The first location $L_1$ (FIG. 2) is downstream from the assembly station 20 and upstream of the first roller conveyor assembly 22. In the first location $L_1$, the conveyors $C_1$ and $C_2$ of the assembly station 20, to the conveyors $C_7$ and $C_8$ of the trolley 28, and the conveyors $C_3$ and $C_4$ of the first roller conveyor assembly 22 are all aligned. Consequently, with the trolley 28 in the first location $L_1$, a main workflow path $P_1$ is defined, in which items loaded onto one or more of the skids 30 on the conveyors $C_1$ and $C_2$ of the assembly station 20 can be moved smoothly along the conveyors $C_1$ and $C_2$ of the assembly station 20, to the conveyors $C_7$ and $C_8$ of the trolley 28, and then to the conveyors $C_3$ and $C_4$ of the first roller conveyor assembly 22.

The second location $L_2$ (FIG. 1) is downstream from the optional assembly station 26 and upstream of the second roller conveyor assembly 24. With the trolley 28 in the second location $L_2$, the conveyors $C_7$ and $C_8$ of the trolley 28, and the conveyors $C_9$ and $C_{10}$ of the second roller conveyor assembly 22 are all aligned. Further, with the trolley 28 in the second location $L_2$, a secondary or bypass workflow path $P_2$ is defined, in which items located on one or more of the skids 30 on the trolley 28 can be moved smoothly along the conveyors $C_7$ and $C_8$ of the trolley 28, and eventually to the conveyors $C_9$ and $C_{10}$ of the second roller conveyor assembly 24.

It should be understood from the drawings and the description herein above and below, that the optional assembly station 26 is not a required component, but, rather is entirely optional. In a preferred embodiment, the optional assembly station 26 is omitted. However, if the optional assembly station 26 is employed, it can define an optional portion of the bypass workflow path $P_2$ located upstream of the trolley 28.

The trolley 28 includes a support frame 28a with wheels $W_1$, and the pair of the roller conveyors $C_7$ and $C_8$. The wheels $W_1$ are rotatably supported to a lower portion of the support frame 28a such that the trolley 28 is movable along a pair of tracks $T_1$ and $T_2$ that are fixed to the floor F. Consequently, the trolley 28 is movable along the tracks $T_1$ and $T_2$ in the first direction $D_1$ between the first location $L_1$ and the second location $L_2$. The pair of roller conveyors $C_7$ and $C_8$ are fixed to an upper portion of the support frame 28a and extend in the second direction $D_2$ perpendicular to the first direction $D_2$.

Hence, the feeder roller conveyor assembly 20 (the assembly station 20) is located upstream of the trolley 28, when the trolley 28 is in the first location $L_1$. With the trolley 28 in the first location $L_1$, the skid 30 is easily movable from the assembly station 20 to the trolley 28 and to the first roller conveyor assembly 22.

The second roller conveyor assembly 24 is located adjacent to and parallel to the first roller conveyor assembly 22. The second roller conveyor assembly 24 is positioned such that with the trolley 28 in the second location $L_2$, the second roller conveyor assembly 24 is downstream from the trolley 28, and, the trolley 28 and the second roller conveyor assembly 24 are aligned with one another such that one or more of the skid 30 is movable from the trolley 28 to the second roller conveyor assembly 24.

Figure 3:
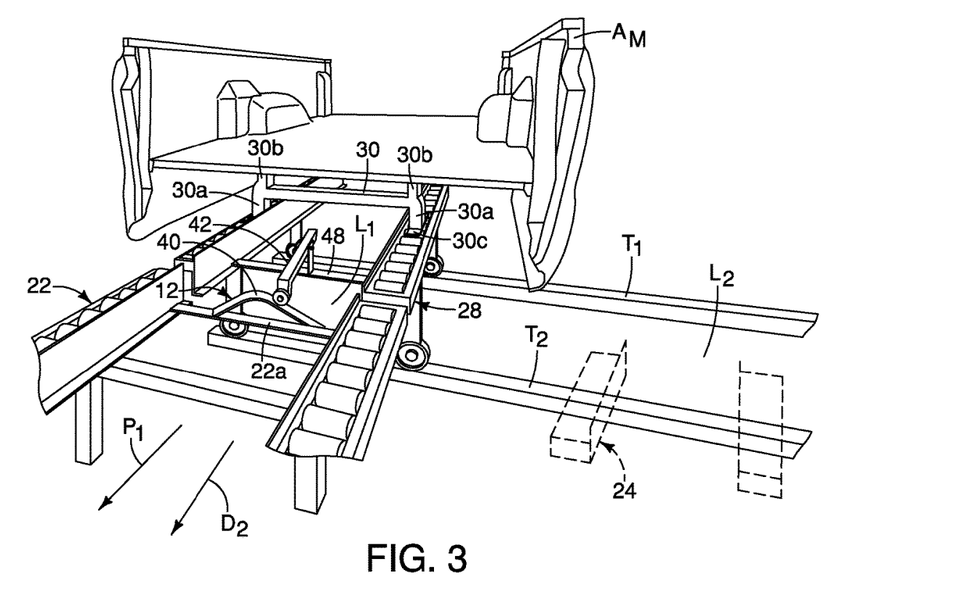
FIG. 3 is a perspective of a portion of the conveyor assembly showing the trolley in a first location between the assembly station and the first roller conveyor assembly and the cam apparatus in a release orientation in accordance with the depicted embodiment.
Figure 4:
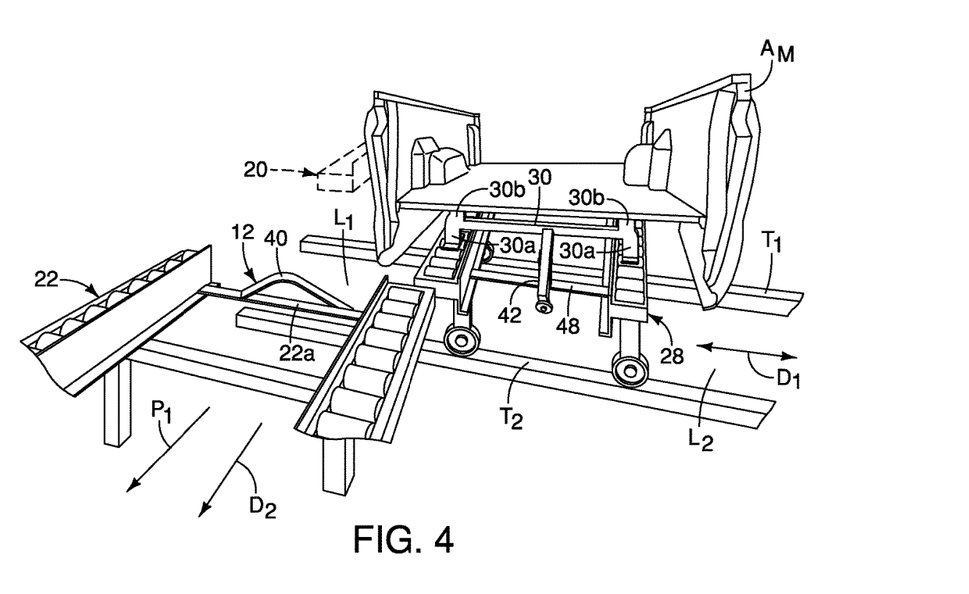
FIG. 4 is another perspective of the portion of the conveyor assembly similar to FIG. 3 showing the trolley moved out of the first location with the cam apparatus in a stop orientation restricting movement of a skid and article of manufacture on the skid in accordance with the depicted embodiment.
Figure 5:
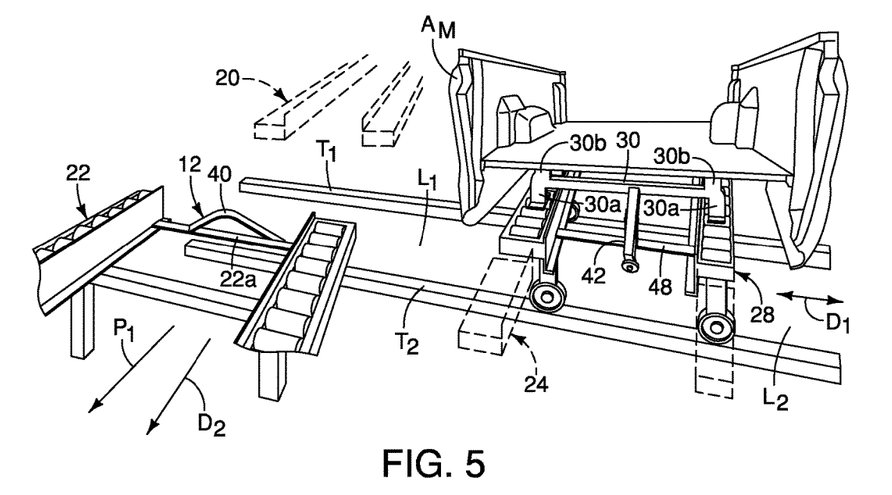
FIG. 5 is another perspective of the portion of the conveyor assembly similar to FIGS. 3 and 4 showing the trolley moved to a second location with the cam apparatus in the stop orientation restricting movement of the skid and article of manufacture on the skid in accordance with the depicted embodiment.

Each of the skids 30 has a lower portion 30a and an upper portion 30b. The lower portion 30a of each of the skid 30a includes a pair of sled portions 30c. The sled portions 30c of the lower portion 30a of the skid 30a are configured such that with the sled portions 30c of the skid 30 positioned on respective ones of the conveyors $C_7$ and $C_8$ of the trolley 28, the skid 30 is moveable in the second direction $D_2$ on the rollers R perpendicular to the first direction $D_1$. As shown in FIGS. 3, 4 and 5, the upper portion 30b is configured to receive an article of manufacture, as described further below. It should be noted that the pairs of the conveyors $C_1$ thru $C_{10}$ are all parallel to one another In the depicted embodiment, the conveyors $C_1$ thru $C_{10}$ can be level, but are preferably inclined slightly such that gravity causes movement of the skids 30 in a downstream direction. In other words, the conveyors $C_1$ and $C_2$ of the assembly station 20 are inclined such that gravity can act on the skids 30 assisting their movement downstream toward the trolley 28 (with the trolley 28 in the first location $L_1$) and to the first roller conveyor assembly 22.

An angle of inclination of each of the conveyors $C_1$ thru $C_{10}$ can be any value between 5° and 1°. In the depicted embodiment, the angle of inclination of conveyors $C_1$ thru $C_{10}$ all have an angle of inclination that is approximately 2°.

As shown in FIGS. 3, 4 and 5, the trolley 28 is loaded with an article of manufacture $A_M$ supported by a pair of skids 30 (only one skid 30 is visible in FIGS. 3-5). In the depicted embodiment, the article of manufacture $A_M$ is the cargo area structure of a pickup truck. However, it should be understood that the article of manufacture $A_M$ can be any vehicle component or other manufactured component assembled in one location and moved to another location along the various conveyor assemblies 20, 22, 24 and the trolley 28. In the depicted application of the conveyor assembly 10, the article of manufacture $A_M$ can be assembled at the assembly station 20 and then is moved on to the trolley 28. Thereafter, the article of manufacture $A_M$ can be moved from the trolley 28 to the first roller conveyor assembly 24 to a further assembly station (not shown) within the manufacturing facility downstream from the first roller conveyor assembly 24.

The assembly station 20 in the depicted embodiment is configured such that a technician can assembly several different variations of a cargo area structure of a pickup truck (the article of manufacture $A_M$). For example, the depicted article of manufacture $A_M$ is a standard cargo area structure. Alternatively, the article of manufacture can be a long bed cargo area structure. When the assembly station 20 is used to assemble a standard cargo area structure, the standard cargo area structure is moved to the trolley 28 with the trolley 28 in the first location $L_1$. The standard cargo area structure (the article of manufacture $A_M$) is then moved along the trolley 28 to the first roller conveyor assembly 22. Thereafter, the article of manufacture $A_M$ can be mated downstream with a truck body and/or truck frame as needed or desired.

When the assembly station 20 is used to assemble a long bed cargo area structure, the long bed cargo area structure is moved from the assembly station 20 onto the trolley 28. The trolley 28 is then moved from the first location $L_1$ to the second location $L_2$. Thereafter, the long bed cargo area structure is moved from the trolley 28 at the second location $L_2$ onto the second roller conveyor assembly 24. Thereafter, the long bed cargo area structure can be mated downstream with a truck body and/or truck frame as needed or desired.

Hence, when the trolley 28 is in the first location $L_1$ and the the article of manufacture $A_M$ is to be moved to the first roller conveyor assembly 22, the skids 30 are moved along the rollers to their next destination over the trolley 28 and to the first roller conveyor assembly 22. In this situation, there is no need to restrict or prevent movement of the article of manufacture $A_M$ with respect to the trolley 28. However, when a long bed cargo area structure (another the article of manufacture) it is advantageous to provide a mechanism that restricts or prevents movement of the long bed cargo area structure as the trolley 28 is being moved from the first location $L_1$ to the second location $L_2$. The cam apparatus 12 is configured and arranged to selectively and temporarily prevent movement of the long bed cargo area structure (the article of manufacture) as the trolley 28 is being moved from the first location $L_1$ to the second location $L_2$ or vise versa.

A description of the cam apparatus 12 is now provided with specific reference to FIGS. 3-11. The cam apparatus 12 includes two parts, a stationary cam member 40 and a cam follower 42. As shown in FIGS. 3-8 and 10-11. The stationary cam member 40 is fixed to a cross-member 22a of the first roller conveyor assembly 22. The cross-member 22a is rigidly fixed to an upstream end of the first roller conveyor assembly 22 adjacent to the first location $L_1$. In other words, the stationary cam member 40 is positioned downstream from the first location $L_1$.

The cross-member 22a extends in a direction that is parallel to the first direction $D_1$. The stationary cam member 40 is rigidly fixed to the cross-member 22a via, for example, welding techniques. The stationary cam member 40 extends in a direction that can be approximately parallel to the first direction $D_1$ or can be angularly offset relative to the first direction $D_1$ by an acute angle $\alpha$ shown in FIG. 8 and described further below. The stationary cam 40 has a cam surface 46 with a first end 46a and an apex 46b located above the first end 46a with a substantially flat inclined surface portion 46c extending therebetween.

Figure 6:
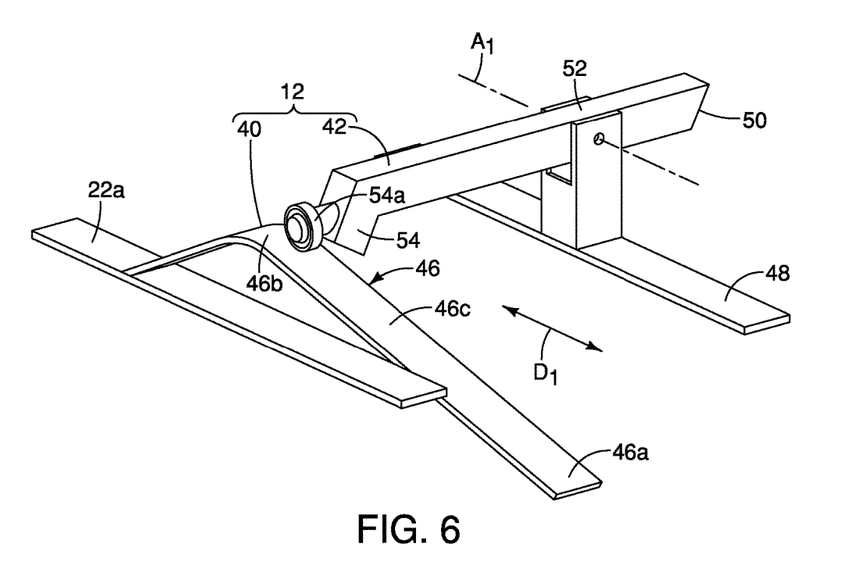
FIG. 6 is a perspective view of the cam apparatus showing a stationary cam member and a cam follower in the release orientation in accordance the depicted embodiment.
Figure 7:
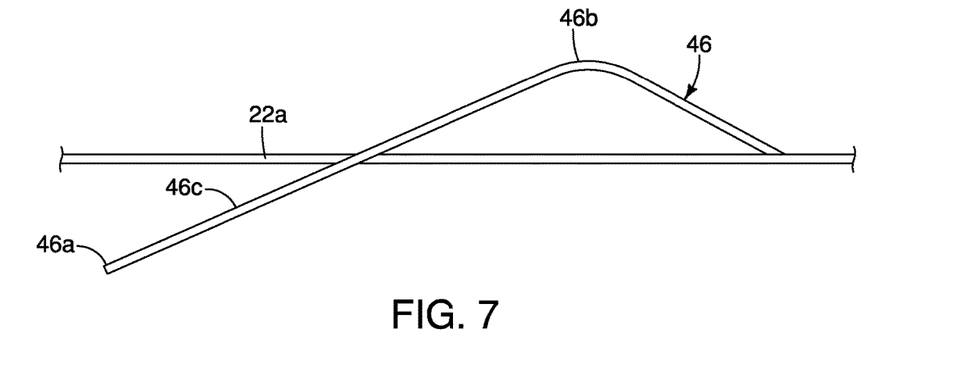
FIG. 7 is a side view of the stationary cam member in accordance with the depicted embodiment.
Figure 8:
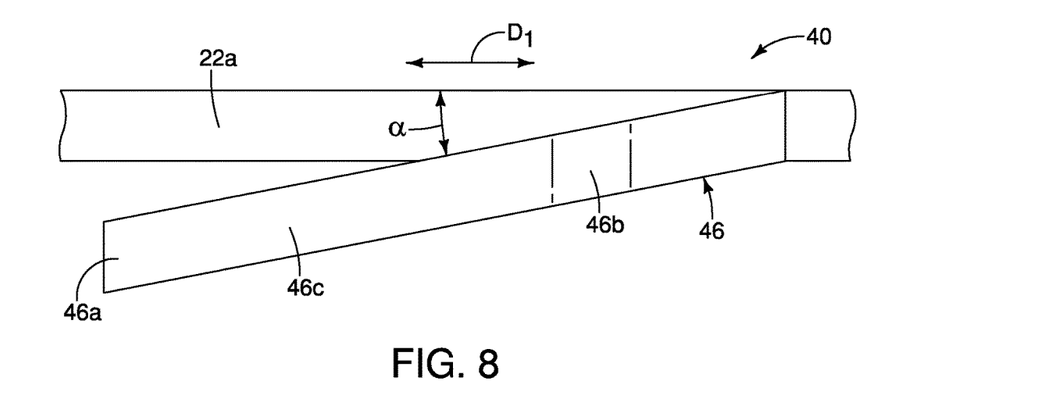
FIG. 8 is a top view of the stationary cam member in accordance with the depicted embodiment.
Figure 9:
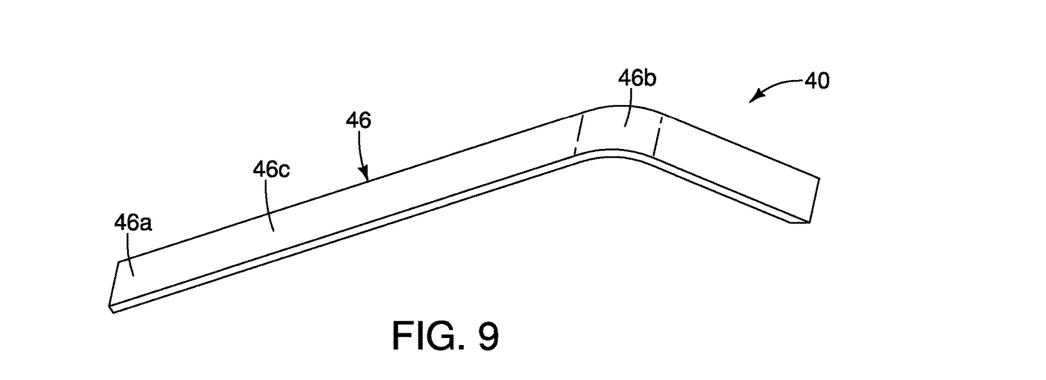
FIG. 9 is a perspective view of the stationary cam member in accordance with the depicted embodiment.
Figure 10:
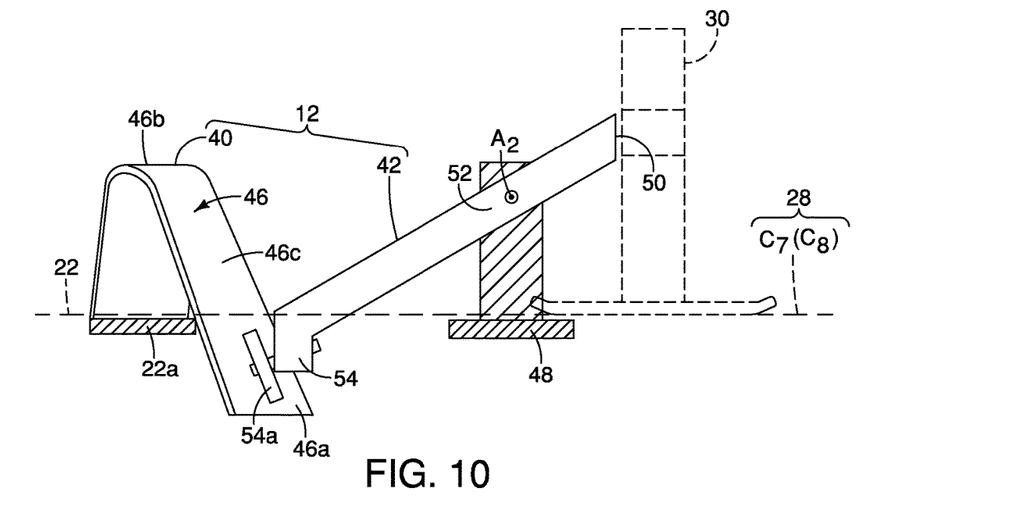
FIG. 10 is a side view of the cam apparatus showing the stationary cam member and the cam follower in the stop orientation in accordance the depicted embodiment.
Figure 11:
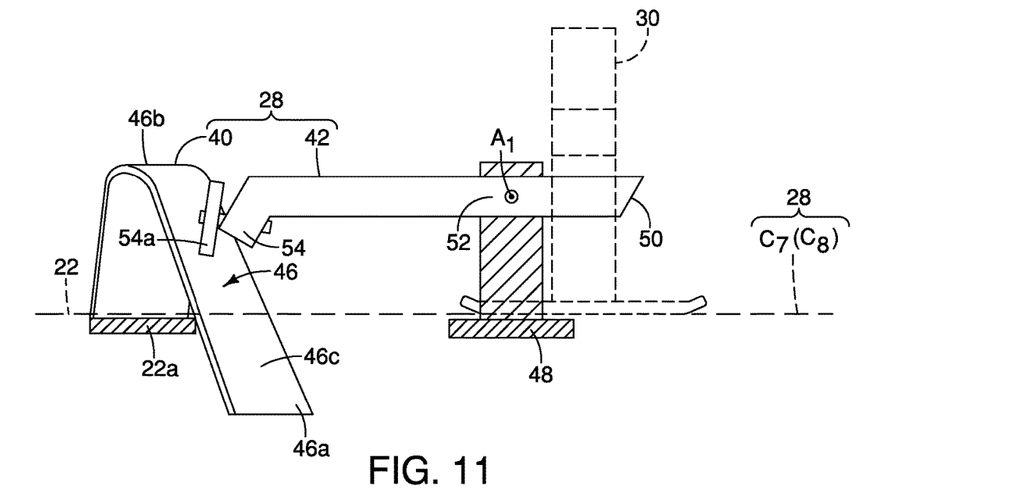
FIG. 11 is another side view of the cam apparatus showing the stationary cam member and the cam follower in the release orientation in accordance the depicted embodiment.

As shown in FIGS. 1-6, 10 and 11, the cam follower 42 is supported to a cross-member 48 of the trolley 28 for pivotal movement about an axis $A_1$. As shown in FIGS. 6, 10 and 11, the cam follower 42 is a rod, beam or lever member that includes a stopper surface 50, a pivot portion 52 and a roller end 54. The stopper surface 50 is a flat surface dimensioned to engage a surface of any one of the skids 30, as described in greater detail below. The pivot portion 52 is supported to the cross-member 48 for pivoting movement about a pivot pin that aligns with or defines the axis $A_1$. The roller end 54 includes a roller 54a that is supported to the roller end 54 for rotating movement with respect thereto.

The cam follower 42 is configured to move (pivot) in response to contact between the roller 54a and the stationary cam 40. Specifically, with the trolley 28 moved to the first location $L_1$ (FIGS. 2, 3 and 11) the roller 54a of the cam follower 42 contacts the cam surface 46 and moves or pivots to a release orientation shown in FIGS. 2, 3, 6 and 11. In the release orientation, the stopper surface 50 moves downward such that the skid 30 can move unrestricted downstream along the conveyors $C_7$ and $C_8$ of the trolley 28 to the first roller conveyor assembly 22 past the cam follower 42. With the trolley 28 moved away from the first location $L_1$ shown in FIG. 4, or to the second location $L_2$ as shown in FIGS. 1, 5 and 11 the cam follower 42 moves to a stop orientation. In the stop orientation, the stopper surface 50 of the cam follower 42 contacts the skid 30 restricting movement of the skid 30.

As shown in FIG. 10, the cam follower 42 is configured such that in the absence of contact with the stationary cam member 40, the cam follower 42 is biased by gravity to move to the stop orientation. As shown in FIG. 10, the first end 46a (the lower end) of the cam surface 46 of the stationary cam member 40 that is located below the cam follower 42 such that the roller 54a of the cam follower 42 makes contact with the stationary cam member 40 as the trolley 28 moves to the first location $L_1$. The apex 46b of the cam surface 46 is located above the first end 46a, as shown in FIGS. 6, 10 and 11.

The acute angle $\alpha$ of the stationary cam member 40 is determined based on the pivoting movement of the cam follower 42. The distance between the roller 54a and the pivot portion 52 (and the axis $A_1$) determines linear movement of the roller 54 as the cam follower 42 is moved along an arc of movement of the cam follower 42. In other words, if the cam follower 42 has a relatively short length measured from the roller 54a to the axis $A_1$, the horizontal component of movement of the roller 54a is large relative to horizontal movement of the roller 54a on a cam follower having a much greater length measured from the roller to the axis $A_1$. In other words, the acute angle $\alpha$ is determined by the horizontal movement of the roller 54a as the cam follower 42 pivots about the axis $A_1$. Hence, the acute angle $\alpha$ can be anywhere between 5° and 20°. In the depicted embodiment, the acute angle $\alpha$ is approximately 12° but can be less than 10 degrees, or between 8° and 9°.

Once in the second location $L_2$, the cam follower 42 can be manually moved from the stop orientation shown in FIG. 10 to the release orientation shown in FIG. 11, thereby allowing the skid 30 and any article of manufacture thereon to move to the second roller conveyor assembly 24.

Although not shown, it should be understood from the drawings and the description herein that an optional second one of the cam apparatus 12 (not shown) can also be provided to an upstream end of the second roller conveyor assembly 24. The cam apparatus at the upstream end of the second roller conveyor assembly 24 would be a mirror image of the cam apparatus 12 described above and would be configured such that once the trolley 28 is moved to the second location $L_2$, the second cam apparatus would be moved to the release orientation such that the skid 30 would be free to move from the trolley 28 to the second roller conveyor assembly 24.

The conveyor assembly 10 can also be provided with a locking mechanism (not shown) that releasably retains the trolley 28 in the first location $L_1$. The locking mechanism can be a mechanical latch that hooks on to the trolley 28 retaining it in in the first location $L_1$ until released to move from the first location $L_1$ to the second location $L_2$.

The various elements of the conveyor apparatus 10 other than the cam apparatus 12 may be conventional components that are well known in the art. Since such conveyor elements are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the conveyor assembly. Accordingly, these terms, as utilized to describe the present invention should be interpreted relative to a vehicle equipped with the conveyor assembly.

The term "configured" as used herein to describe a component, section or part of a device includes structure that is constructed and/or arranged to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A conveyor assembly, comprising:
   a trolley movable in a first direction between a first location and a second location spaced apart from the first location;
   a skid configured such that with the skid positioned on the trolley, the skid is moveable in a second direction perpendicular to the first direction;
   a stationary cam member positioned downstream from the first location; and
   a cam follower fixed to the trolley for pivotal movement with respect thereto, the cam follower being configured to move in response to contact with the stationary cam such that with the trolley in the first location the cam follower moves to a release orientation and with the trolley moved to the second location the cam follower moves to a stop orientation, whereby in the stop orientation a surface of the cam follower contacts the skid restricting movement of the skid and in the release orientation the cam follower is moved away from the skid such that the skid is movable in the second direction past the cam follower.

2. The conveyor assembly according to claim 1, wherein the stationary cam extends in a direction approximately parallel to the first direction.

3. The conveyor assembly according to claim 1, wherein the stationary cam has a cam surface with a first end located below the cam follower and an apex located above the first end with a substantially flat inclined surface extending therebetween.

4. The conveyor assembly according to claim 1, wherein the cam follower is configured such that in the absence of contact with the stationary cam the cam follower is biased to move by gravity to the stop orientation.

5. The conveyor assembly according to claim 1, further comprising:
   a first roller conveyor assembly located downstream of the trolley with the trolley in the first location such that in the first location the first roller conveyor assembly and the trolley are aligned with one another such that the skid is movable from the trolley to the first roller conveyor assembly.

6. The conveyor assembly according to claim 5, further comprising:
   a second roller conveyor assembly located adjacent to and parallel to the first roller conveyor assembly, the second roller conveyor assembly being positioned such that with the trolley in the second location, the second roller conveyor assembly is downstream from the trolley, and the trolley and the second roller conveyor assembly are aligned with one another such that the skid is movable from the trolley to the second roller conveyor assembly.

7. The conveyor assembly according to claim 6, further comprising
   a feeder roller conveyor assembly located upstream of the trolley when the trolley is in the first location such that with the trolley is in the first location the feeder roller conveyor, the trolley and the first roller conveyor assembly are aligned with one another such that the skid is movable from the feed roller conveyor to the trolley and then to the first roller conveyor assembly.

8. The conveyor assembly according to claim 7, wherein the trolley includes a support frame, wheels and a pair of roller conveyors, the wheels being rotatably supported to a lower portion of the support frame such that the trolley is movable along a pair of tracks in the first direction between the first location and the second location, the pair of roller conveyors being fixed to an upper portion of the support frame and extending in the second direction perpendicular to the first direction.

9. The conveyor assembly according to claim 5, further comprising
   a feeder roller conveyor assembly located upstream of the trolley when the trolley is in the first location such that with the trolley is in the first location the feeder roller conveyor, the trolley and the first roller conveyor assembly are aligned with one another such that the skid is movable from the feed roller conveyor to the trolley and then to the first roller conveyor assembly.

10. The conveyor assembly according to claim 1, wherein the stationary cam extends in a cam direction and defines an acute angle with respect to the first direction, the acute angle being less than 10 degrees.

11. The conveyor assembly according to claim 10, wherein
    the acute angle between the cam direction and the first direction is between 8 and 9 degrees.

12. The conveyor assembly according to claim 1, wherein
the trolley includes a support frame, wheels and a pair of roller conveyors, the wheels being rotatably supported to a lower portion of the support frame such that the trolley is movable along a pair of tracks in the first direction between the first location and the second location, the pair of roller conveyors are fixed to an upper portion of the support frame and extending in the second direction perpendicular to the first direction.

13. The conveyor assembly according to claim 1, wherein
the skid has lower portions and upper portions, the lower portions of the skid being configured such that with the lower portions of the skid positioned on the trolley, the skid is moveable in the second direction, the upper portions being configured to receive an article of manufacture.

14. A conveyor assembly, comprising:
a feeder roller conveyor assembly;
a trolley movable in a first direction between a first location aligned with and downstream from the feeder roller conveyor assembly and a second location spaced apart from the first location;
a skid configured such that with the skid positioned on the trolley, the skid is moveable in a second direction perpendicular to the first direction;
a first roller conveyor assembly located downstream of the feeder roller conveyor assembly such that with the trolley in the first location, the feeder roller conveyor assembly, the trolley and the first roller conveyor assembly are aligned with one another such that the skid is movable from the feeder roller conveyor assembly over the trolley; and to the first roller conveyor assembly;
a stationary cam member fixed to the first roller conveyor assembly; and
a cam follower pivotally supported to the trolley and being configured to move in response to contact with the stationary cam such that with the trolley in the first location the cam follower moves to a release orientation and with the trolley moved to the second location the cam follower moves to a stop orientation, whereby in the stop orientation a surface of the cam follower contacts the skit restricting movement of the skid and in the release orientation the cam follower is moved away from the skid such that the skid is movable in the second direction from the trolley to the first roller conveyor.

15. The conveyor assembly according to claim 14, further comprising:
a second roller conveyor assembly located adjacent to and parallel to the first roller conveyor assembly, the second roller conveyor assembly being positioned such that with the trolley in the second location, the second roller conveyor assembly is downstream from the trolley, and the trolley and the second roller conveyor assembly are aligned with one another such that the skid is movable from the trolley to the second roller conveyor assembly.

16. The conveyor assembly according to claim 15, wherein
the trolley includes a support frame, wheels and a pair of roller conveyors, the wheels being rotatably supported to a lower portion of the support frame such that the trolley is movable along a pair of tracks in the first direction between the first location downstream of the feeder roller assembly and upstream from the first roller conveyor assembly, and the second location where the trolley is spaced apart from the feeder roller conveyor assembly and the first roller conveyor assembly, and is aligned and upstream of the second roller conveyor assembly.

17. The conveyor assembly according to claim 14, wherein
the cam follower pivotally supported to a downstream end of the trolley relative to the second direction.

18. The conveyor assembly according to claim 14, wherein
the stationary cam extends in a cam direction and defines an acute angle with respect to the first direction, the acute angle being less than 10 degrees.

19. The conveyor assembly according to claim 18, wherein
the acute angle between the cam direction and the first direction is between 8 and 9 degrees.

20. The conveyor assembly according to claim 14, wherein
the skid includes lower portions and upper portions, the lower portions of the skid being configured such that with the lower portions of the skid positioned on the trolley, the skid is moveable in the second direction from the feeder roller conveyor assembly to the trolley and from the trolley to the first roller conveyor assembly, the upper portions being configured to receive an article of manufacture.

* * * * *